(12) United States Patent
Yokohara et al.

(10) Patent No.: US 9,316,423 B2
(45) Date of Patent: Apr. 19, 2016

(54) CONTAINER REFRIGERATION APPARATUS

(75) Inventors: Kazuma Yokohara, Osaka (JP);
Yuusuke Fujimoto, Osaka (JP); Atsushi Okamoto, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 690 days.

(21) Appl. No.: 13/511,874

(22) PCT Filed: Oct. 22, 2010

(86) PCT No.: PCT/JP2010/006287
§ 371 (c)(1),
(2), (4) Date: May 24, 2012

(87) PCT Pub. No.: WO2011/064942
PCT Pub. Date: Jun. 3, 2011

(65) Prior Publication Data
US 2012/0272673 A1 Nov. 1, 2012

(30) Foreign Application Priority Data
Nov. 25, 2009 (JP) .................. 2009-268028

(51) Int. Cl.
*F25B 29/00* (2006.01)
*F25B 41/04* (2006.01)
(Continued)

(52) U.S. Cl.
CPC .............. *F25B 41/04* (2013.01); *F25D 11/003* (2013.01); *F25B 2400/0403* (2013.01);
(Continued)

(58) Field of Classification Search
CPC ............... F25B 2600/0253; F25B 2600/2501; F25B 2600/2513; F25B 2600/2515; F25B 2600/02; F25B 2600/25; F25B 2600/111; F25B 2600/112; F25B 2700/2115; F25B 2700/171; F25B 2700/172; F25B 2700/173; F25B 1/00; F25B 40/00; F25B 41/062; F25B 2313/0293; F25B 2313/0294
USPC ........................................... 62/314
See application file for complete search history.

(56) References Cited

U.S. PATENT DOCUMENTS 3,559,422 A * 2/1971 Holzer ............................ 62/209
5,197,297 A * 3/1993 Brendel et al. ................... 62/81
(Continued)

FOREIGN PATENT DOCUMENTS

EP 1 103 296 A1 5/2001
EP 1 923 646 A1 5/2008
(Continued)

OTHER PUBLICATIONS

Machine generated English translation for JP-2003-83621-A, dated Mar. 19, 2003.
(Continued)

*Primary Examiner* — M. Alexandra Elve
*Assistant Examiner* — Larry Furdge
(74) *Attorney, Agent, or Firm* — Birch, Stewart, Kolasch & Birch, LLP

(57) ABSTRACT

A container refrigeration apparatus includes: a refrigerant circuit which performs a refrigeration cycle, and includes a main circuit sequentially connecting a compressor, a condenser, a main expansion valve and an evaporator, and a hot gas bypass circuit through which a refrigerant compressed in the compressor bypasses the condenser and the main expansion valve to flow into the evaporator; and a compressor control section which controls operating speed of rotation of the compressor during heating operation for heating inside of a container by the evaporator while returning the compressed refrigerant from the compressor to the compressor through the hot gas bypass circuit and the evaporator so that a temperature inside the container reaches a target temperature.

3 Claims, 8 Drawing Sheets

(51) Int. Cl.
  *F25D 11/00* (2006.01)
  *F25D 31/00* (2006.01)

(52) U.S. Cl.
  CPC ........ *F25B 2400/13* (2013.01); *F25B 2400/19* (2013.01); *F25B 2600/0253* (2013.01); *F25B 2600/2507* (2013.01); *F25B 2700/1931* (2013.01); *F25B 2700/1933* (2013.01); *F25B 2700/2103* (2013.01); *F25B 2700/2106* (2013.01); *F25B 2700/21151* (2013.01); *F25B 2700/21152* (2013.01); *F25B 2700/21172* (2013.01); *F25B 2700/21173* (2013.01); *F25B 2700/21174* (2013.01); *F25B 2700/21175* (2013.01); *F25D 31/005* (2013.01); *Y02B 30/741* (2013.01); *Y02B 40/32* (2013.01)

(56) References Cited

U.S. PATENT DOCUMENTS 6,058,728 A  5/2000  Takano et al.
2007/0186581 A1* 8/2007 Mistry et al. .................... 62/505
2009/0241573 A1  10/2009 Ikegami et al.

FOREIGN PATENT DOCUMENTS

| | | | | |
|---|---|---|---|---|
| JP | 5-272817 A | 10/1993 | | |
| JP | 11-257762 A | 9/1999 | | |
| JP | 2003-83621 A | 3/2003 | | |
| JP | 2003083621 A | * 3/2003 | ............... | F25B 1/00 |
| JP | 2006-38386 A | 2/2006 | | |
| JP | 2008-215645 A | 9/2008 | | |
| JP | 2009-109110 A | 5/2009 | | |
| WO | WO 2005/116539 A1 | 12/2005 | | |

OTHER PUBLICATIONS

Machine generated English translation for JP-5-272817-A, dated Oct. 22, 1993.
Machine generated English Translation for JP-2006-38386-A, dated Feb. 9, 2006.

* cited by examiner

CONTAINER REFRIGERATION APPARATUS

TECHNICAL FIELD

The present invention relates to container refrigeration apparatuses, particularly to measures to improve reliability of the container refrigeration apparatuses.

BACKGROUND ART

A container refrigeration apparatus for cooling the inside of a container is an example of refrigeration apparatuses for performing a refrigeration cycle. Patent Document 1 discloses a container refrigeration apparatus of this type.

The container refrigeration apparatus disclosed by Patent Document 1 includes a refrigerant circuit connecting a compressor, a condenser, an expansion valve, and an evaporator. The evaporator is provided inside a container. In the evaporator, a refrigerant absorbs heat from the air inside the container to evaporate, thereby cooling the inside air.

A bypass circuit is provided in the refrigerant circuit of the container refrigeration apparatus to supply the refrigerant compressed in the compressor (so-called hot gas) directly to the evaporator without passing through the condenser. Specifically, the bypass circuit includes two bypass pipes, and two open/close valves corresponding to the bypass pipes. Each of the bypass pipes communicates a gas line between the compressor and the condenser and a liquid line between the expansion valve and the evaporator. In the container refrigeration apparatus, heating operation of heating the inside air with the hot gas flowing through the evaporator is performed by using the bypass circuit.

Specifically, the heating operation is performed when the inside air is excessively cooled, and the temperature of the inside air is too low. In the heating operation, heating capability is adjusted in two stages based on the conditions of the two open/close valves. When one of the valves is opened in the heating operation, the hot gas flows through one of the bypass pipes to be fed to the evaporator. Thus, a flow rate of the refrigerant flowing through the evaporator is relatively reduced. Accordingly, the capability of heating the inside of the container is relatively reduced. When both of the valves are opened in the heating operation, the hot gas flows through the two bypass pipes to be fed to the evaporator. Thus, the flow rate of the refrigerant flowing through the evaporator is relatively increased. Accordingly, the capability of heating the inside of the container is relatively increased.

CITATION LIST

Patent Document

[Patent Document 1] Japanese Patent Publication No. 2008-215645

SUMMARY OF THE INVENTION

Technical Problem

In the container refrigeration apparatus of Patent Document 1 described above, the capability of heating the inside of the container in the heating operation is adjusted by opening or closing the two open/close valves. However, use of the two open/close valves in the heating operation complicates the refrigerant circuit and increases costs. In addition, fine adjustment of the heating capability cannot be made by merely regulating the flow rate in the bypass pipes by opening or closing the two open/close valves. Thus, the heating capability may be too low to quickly heat the inside air to a target temperature, or the heating capability may be too high to save energy.

In view of the foregoing, the present invention has been achieved. The present invention is concerned with providing a container refrigeration apparatus capable of appropriately adjusting the heating capability in the heating operation using a hot gas bypass circuit.

Solution to the Problem

A first aspect of the invention is directed to a container refrigeration apparatus including: a refrigerant circuit (20) which performs a refrigeration cycle, and includes a main circuit (21) sequentially connecting a compressor (30), a condenser (31), an expansion valve (32) and an evaporator (33), and a hot gas bypass circuit (22) through which a compressed refrigerant from the compressor (30) bypasses the condenser (31) and the expansion valve (32) to flow into the evaporator (33); and a compressor control section (81) which controls operating speed of rotation of the compressor (30) during heating operation for heating inside of a container by the evaporator (33) with the compressed refrigerant circulating from the compressor (30) to the compressor (30) through the hot gas bypass circuit (22) and the evaporator (33) so that a temperature inside the container reaches a target temperature.

According to the first aspect of the invention, when the temperature inside the container is too low as compared with the target temperature, the high temperature refrigerant compressed in the compressor (30) bypasses the condenser (31) and flows into the evaporator (33), thereby heating the inside of the container. The operating speed of rotation of the compressor (30) is controlled so that the temperature inside the container reaches the target temperature. For example, the operating speed of rotation of the compressor (30) is increased when the temperature inside the container is significantly lower than the target temperature, and the operating speed of rotation of the compressor (30) is reduced when the temperature inside the container is slightly lower than the target temperature.

In a second aspect of the invention related to the first aspect of the invention, the container refrigeration apparatus further includes: a refrigerant amount control section (82) which performs, in the heating operation, refrigerant discharge operation for allowing part of the compressed refrigerant from the compressor (30) to flow and remain in a high pressure liquid pipe (25) including the condenser (31) of the main circuit (21), and refrigerant feeding operation for feeding the refrigerant in the high pressure liquid pipe (25) to the compressor (30), based on a degree of superheat SH of the compressed refrigerant from the compressor (30).

According to the second aspect of the invention, the refrigerant discharge operation is performed when the degree of superheat SH of the compressed refrigerant is lower than a predetermined value. This reduces the amount of the refrigerant circulating between the compressor (30) and the evaporator (33), thereby increasing the degree of superheat SH of the compressed refrigerant. The refrigerant feeding operation is performed when the degree of superheat SH of the compressed refrigerant is higher than the predetermined value. This increases the amount of the refrigerant circulating between the compressor (30) and the evaporator (33), thereby reducing the degree of superheat SH of the compressed refrigerant.

In a third aspect of the invention related to the second aspect of the invention, the container refrigeration apparatus further includes: a supercooling heat exchanger (44) provided on the high pressure liquid pipe (25); and a supercooling branch pipe (26) through which the refrigerant diverted from the high pressure liquid pipe (25) flows to supercool the refrigerant in a liquid state flowing through the high pressure liquid pipe (25) in the supercooling heat exchanger (44), and then flows into the low pressure gas pipe (28) of the main circuit (21) or an intermediate pressure compression chamber in the compressor (30), wherein the refrigerant amount control section (82) feeds the refrigerant in the high pressure liquid pipe (25) to the compressor (30) through the supercooling branch pipe (26) in the refrigerant feeding operation.

According to the third aspect of the invention, in the refrigerant feeding operation, the refrigerant remaining in the condenser (31) or the high pressure liquid pipe (25) is fed to the compressor (30) through the supercooling branch pipe (26). This increases the amount of the refrigerant circulating between the compressor (30) and the evaporator (33).

In a fourth aspect of the invention related to the second or third aspect of the invention, the container refrigeration apparatus further includes: a fan control section (83) which operates a condenser fan (35) of the condenser (31) in the refrigerant discharge operation performed by the refrigerant amount control section (82).

According to the fourth aspect of the invention, in the refrigerant discharge operation, the air is sent to the condenser (31) by the condenser fan (35). Part of the compressed refrigerant from the compressor (30) flows into the condenser (31), and exchanges heat with the air sent by the condenser fan (35) to condense.

In a fifth aspect of the invention related to the second or third aspect of the invention, the container refrigeration apparatus further includes: a fan control section (83) which, in the heating operation, stops an evaporator fan (36) of the evaporator (33) when the degree of superheat SH of the compressed refrigerant from the compressor (30) is lower than a predetermined value, and operates the evaporator fan (36) of the evaporator (33) when the degree of superheat SH of the compressed refrigerant from the compressor (30) is higher than the predetermined value.

According to the fifth aspect of the invention, when the evaporator fan (36) is stopped, the refrigerant is not easily condensed in the evaporator (33), and the refrigerant in a gas state returns to the compressor (30). Specifically, the degree of superheat SH of the compressed refrigerant is increased. When the evaporator fan (36) is operated, the inside air is actively sent to the evaporator (33), thereby promoting the heating of the inside air.

Advantages of the Invention

According to the present invention described above, the operating speed of rotation of the compressor (30) is controlled so that the temperature inside the container reaches the target temperature in the heating operation. This allows appropriate and quick adjustment of the heating capability based on the temperature inside the container. Thus, the temperature inside the container can appropriately and quickly approach the target temperature.

According to the second aspect of the invention, the amount of the refrigerant circulating between the compressor (30) and the evaporator (33) is adjusted based on the degree of superheat SH of the discharged refrigerant. Specifically, when the degree of superheat SH is low, part of the refrigerant circulating between the compressor (30) and the evaporator (33) is discharged to the high pressure liquid pipe (25), thereby reducing the amount of the circulating refrigerant, and increasing the degree of superheat SH. This can prevent feeding of a two-phase refrigerant to the compressor (30) (i.e., liquid compression in the compressor (30)). When the degree of superheat SH is high, the refrigerant in the high pressure liquid pipe (25) is added to the refrigerant circulating between the compressor (30) and the evaporator (33), thereby increasing the amount of the circulating refrigerant, and reducing the degree of superheat SH. This can prevent abnormal increase in temperature of the refrigerant discharged from the compressor (30), thereby protecting the compressor (30).

According to the fourth aspect of the invention, the condenser fan (35) is operated in the refrigerant discharge operation. Thus, part of the compressed refrigerant discharged to the condenser (31) can actively be condensed so that the refrigerant is liquefied. As a result, a large amount of the refrigerant can be kept in the condenser (31) or the high pressure liquid pipe (25), thereby performing the refrigerant discharge operation smoothly and reliably.

According to the fifth aspect of the invention, the evaporator fan (36) is controlled based on the degree of superheat SH of the discharge refrigerant in the heating operation. This can surely prevent feeding of the two-phase refrigerant to the compressor (30) (i.e., liquid compression in the compressor (30)). Thus, the reliability of the container refrigeration apparatus (10) improves.

DESCRIPTION OF EMBODIMENTS

An embodiment of the present invention will be described in detail with reference to the drawings. The embodiment is set forth merely for the purposes of preferred examples in nature, and are not intended to limit the scope, applications, and use of the invention.

A container refrigeration apparatus (10) of the present embodiment cools the inside of a container which is not shown. The container refrigeration apparatus (10) also serves as a lid for closing a side opening of a container body.

Figure 1:
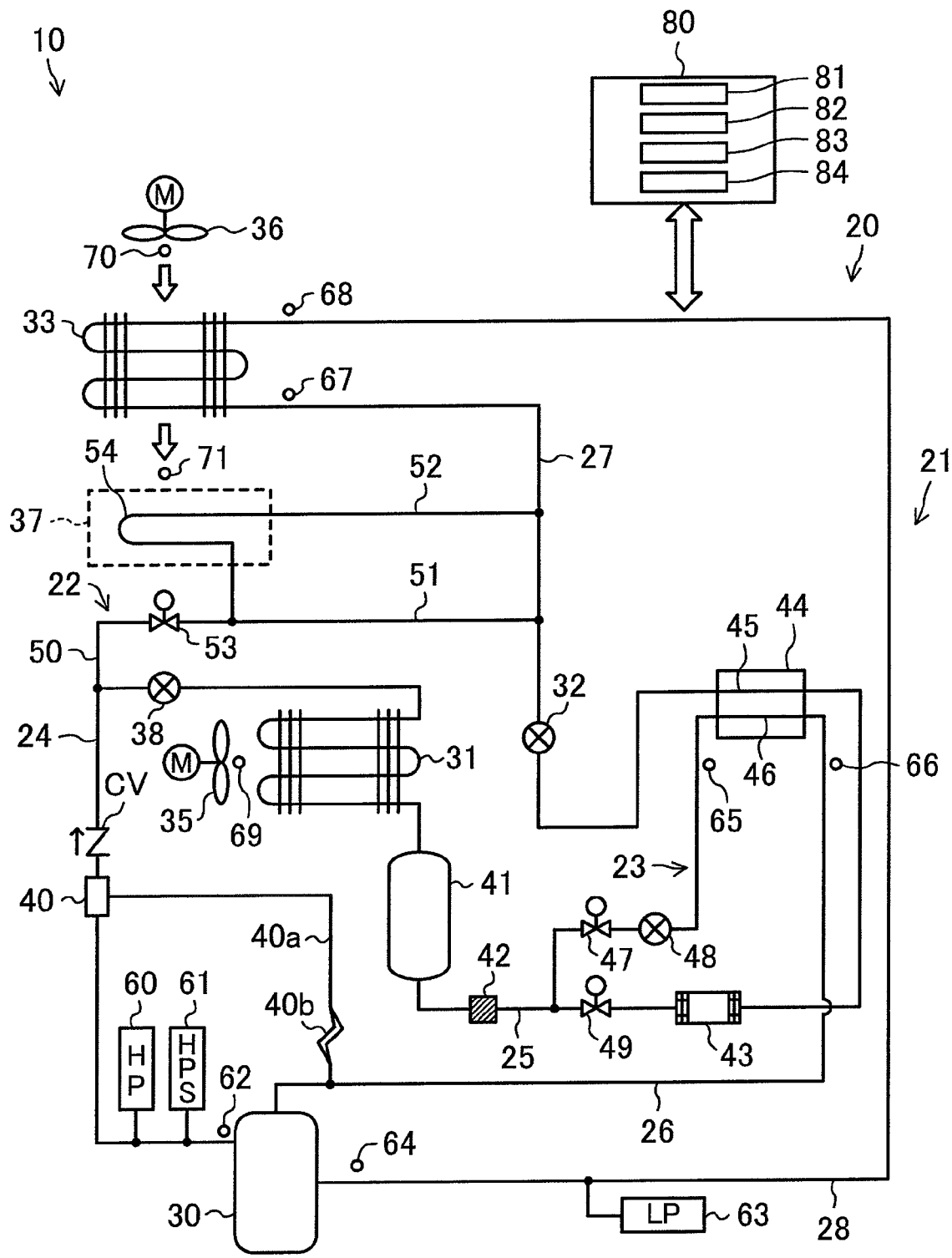
FIG. 1 is a piping diagram of a container refrigeration apparatus.

As shown in FIG. 1, the container refrigeration apparatus (10) includes a refrigerant circuit (20) in which a refrigerant circulates to perform a refrigeration cycle. The refrigerant circuit (20) includes a main circuit (21), a hot gas bypass circuit (22), and a supercooling circuit (23).

The main circuit (21) includes a compressor (30), a condenser (31), a main expansion valve (32), and an evaporator (33) which are sequentially connected in series through refrigerant pipes.

The compressor (30) includes a motor (not shown) for driving a compression mechanism. Speed of rotation of the motor of the compressor (30) is controlled in multiple stages by an inverter. Specifically, operating speed of rotation of the compressor (30) is variable. The condenser (31) and the evaporator (33) are fin-and-tube heat exchangers, respectively. The condenser (31) is placed outside the container. An outside fan (35) is provided near the condenser (31). Outside air and the refrigerant exchange heat in the condenser (31). The evaporator (33) is placed inside the container. An inside fan (36) is provided near the evaporator (33). Inside air and the refrigerant exchange heat in the evaporator (33). A drain pan (37) is provided below the evaporator (33). The drain pan (37) is a flat container having an opening facing upward. The drain pan (37) collects frost, ice blocks fell from the evaporator (33), water condensed from the air, etc. The degree of opening of the main expansion valve (32) can be adjusted in multiple stages by a pulse motor. The outside fan (35) and the inside fan (36) constitute a condenser fan and an evaporator fan of the present invention, respectively.

An oil separator (40), a check valve (CV), and a pressure regulating valve (38) are sequentially provided on a high pressure gas pipe (24) between the compressor (30) and the condenser (31). An oil return pipe (40a) of the oil separator (40) is connected to the supercooling circuit (23). A capillary tube (40b) is provided in the oil return pipe (40a). The check valve (CV) allows the refrigerant to flow in a direction of an arrow indicated in FIG. 1, and prohibits the refrigerant from flowing in the opposite direction. The degree of opening of the pressure regulating valve (38) can be adjusted in multiple stages by the pulse motor.

A receiver (41), a cooling member (42), a dryer (43), a second open/close valve (49), and a supercooling heat exchanger (44) are sequentially provided in a high pressure liquid pipe (25) between the condenser (31) and the main expansion valve (32). A refrigerant path is formed inside the cooling member (42), and a power device of an inverter circuit (not shown) is in contact with the outside of the cooling member (42). Specifically, the cooling member (42) is configured to cool the power device with the refrigerant. The second open/close valve (49) is a solenoid valve which is freely opened and closed. The dryer (43) is configured to capture moisture in a liquid refrigerant flowing through the condenser (31).

The supercooling heat exchanger (44) cools the liquid refrigerant flowing through the condenser (31). The supercooling heat exchanger (44) includes a primary passage (45) and a secondary passage (46). Specifically, in the supercooling heat exchanger (44), the refrigerant flowing through the primary passage (45) and the refrigerant flowing through the secondary passage (46) exchange heat. The primary passage (45) is connected to the high pressure liquid pipe (25) of the main circuit (21), and the secondary passage (46) is connected to a supercooling branch pipe (26) of the supercooling circuit (23). An inlet end of the supercooling branch pipe (26) is connected to the high pressure liquid pipe (25) between the cooling member (42) and the second open/close valve (49). An outlet end of the supercooling branch pipe (26) is connected to a compression chamber in the compressor (30) at an intermediate pressure (intermediate pressure compression chamber). Specifically, the supercooling branch pipe (26) is a passage into which part of the liquid refrigerant in the high pressure liquid pipe (25) is diverted and flows into the intermediate pressure compression chamber of the compressor (30). A first open/close valve (47) and a supercooling expansion valve (48) are provided on the supercooling branch pipe (26) near an inlet of the secondary passage (46). The first open/close valve (47) is a solenoid valve which is freely opened and closed. The degree of opening of the supercooling expansion valve (48) can be adjusted in multiple stages by the pulse motor. The supercooling expansion valve (48) constitutes a decompression mechanism for decompressing the refrigerant.

The hot gas bypass circuit (22) includes a single main passage (50), and two branch passages (51, 52) (a first branch passage (51) and a second branch passage (52)) branched from the main passage (50). An inlet end of the main passage (50) is connected to the high pressure gas pipe (24) between the check valve (CV) and the pressure regulating valve (38). A third open/close valve (53) is provided in the main passage (50). The third open/close valve (53) is a solenoid valve which is freely opened and closed.

An end of the first branch passage (51) is connected to an outlet end of the main passage (50), and the other end is connected to a low pressure liquid pipe (27) between the main expansion valve (32) and the evaporator (33). Likewise, an end of the second branch passage (52) is connected to the outlet end of the main passage (50), and the other end is connected to the low pressure liquid pipe (27). The second branch passage (52) is made of a refrigerant pipe longer than the first branch passage (51). The second branch passage (52) includes a drain pan heater (54) which extends in a serpentine form on a bottom of the drain pan (37). The drain pan heater (54) is configured to heat the inside of the drain pan (37) with the refrigerant. Thus, the hot gas bypass circuit (22) constitutes a bypass circuit for feeding the refrigerant compressed in the compressor (30) (a high temperature and high pressure gaseous refrigerant discharged from the compressor (30)) to the evaporator (33).

The refrigerant circuit (20) includes various sensors. Specifically, a high pressure sensor (60), a high pressure switch (61), and a discharge temperature sensor (62) are provided on the high pressure gas pipe (24). The high pressure sensor (60) detects a pressure of the high pressure gaseous refrigerant discharged from the compressor (30). The discharge temperature sensor (62) detects a temperature of the high pressure gaseous refrigerant discharged from the compressor (30). A low pressure sensor (63) and a suction temperature sensor (64) are provided on a low pressure gas pipe (28) between the evaporator (33) and the compressor (30). The low pressure sensor (63) detects a pressure of the low pressure gaseous refrigerant sucked into the compressor (30). The suction temperature sensor (64) detects a temperature of the low pressure gaseous refrigerant sucked into the compressor (30).

An inlet temperature sensor (65) and an outlet temperature sensor (66) are provided on the supercooling branch pipe (26) near the inlet and the outlet of the secondary passage (46), respectively. The inlet temperature sensor (65) detects the temperature of the refrigerant immediately before flowing into the secondary passage (46). The outlet temperature sensor (66) detects the temperature of the refrigerant immediately after flowing out of the secondary passage (46).

An inlet temperature sensor (67) is provided on the low pressure liquid pipe (27) near an inlet of the evaporator (33). The inlet temperature sensor (67) detects the temperature of the refrigerant immediately before flowing into the evaporator (33). An outlet temperature sensor (68) is provided on the low pressure gas pipe (28) near an outlet of the evaporator (33). The outlet temperature sensor (68) detects the temperature of the refrigerant immediately after flowing out of the evaporator (33).

An outside temperature sensor (69) is provided outside the container near an inlet of the condenser (31). The outside temperature sensor (69) detects the temperature of the outside air immediately before sucked into the condenser (31) (i.e., outside temperature). An inlet temperature sensor (70) is provided inside the container near an inlet of the evaporator (33), and an outlet temperature sensor (71) is provided inside the container near an outlet of the evaporator (33). The inlet temperature sensor (70) detects the temperature of the inside air immediately before passing through the evaporator (33). The outlet temperature sensor (71) detects the temperature of the inside air immediately after passing through the evaporator (33).

The container refrigeration apparatus (10) includes a controller (80) as a control unit for controlling the refrigerant circuit (20). The controller (80) includes a compressor control section (81) for controlling operating speed of rotation of the compressor (30), and a valve control section (82) for controlling the valves (32, 38, 47, 48, 49, 53), and a fan control section (83) for controlling the fans (35, 36), and a refrigerant amount determining section (84) for determining the amount of the refrigerant in heating operation in a cooling mode described later. The valve control section (82) constitutes a refrigerant amount control section of the present invention.

—Working Mechanism—

A working mechanism of the container refrigeration apparatus (10) will be described below. The container refrigeration apparatus is basically operated in a "cooling mode" and a "defrosting mode." The cooling mode is selected to cool the temperature inside the container at a relatively low temperature. Specifically, the cooling mode is selected to perform cold storage/freezing of items contained in the container body (e.g., perishable food). The defrosting mode is selected to melt frost adhered to a surface of a heat transfer pipe of the evaporator etc. by introducing a refrigerant discharged from the compressor (30) into the hot gas bypass circuit (22). The defrosting mode will not be described below.

<Cooling Mode>

Figure 2:
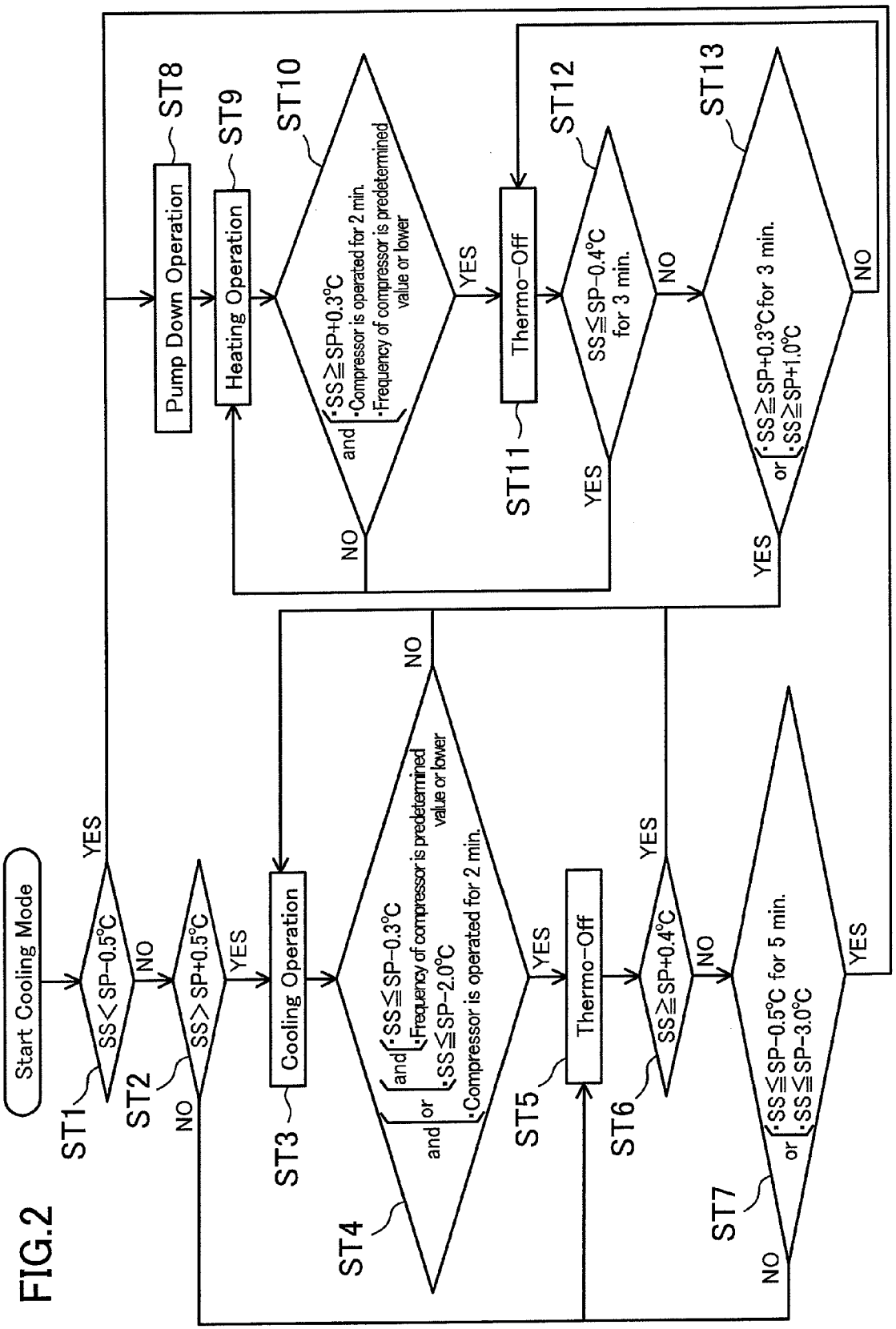
FIG. 2 is a flowchart of operations performed in a cooling mode.

In the cooling mode, "cooling operation," "pump down operation," and "heating operation" are carried out. How the operations are performed will be described with reference to FIG. 2. In FIG. 2, "SS" indicates a temperature of blown air detected by the outlet temperature sensor (71) (blown air temperature), and "SP" is a target inside temperature.

When the cooling operation is started, the blown air temperature SS and the target temperature SP are compared in steps ST1 and ST2. When the blown air temperature SS is lower than "SP−0.5° C.," the flow proceeds to the pump down operation described later (step ST8). When the blown air temperature SS is higher than "SP+0.5° C.," the flow proceeds to the cooling operation (step ST3). In the cooling operation, the compressor (30) is operated to perform the refrigeration cycle in the refrigerant circuit (20), and the inside of the container is cooled by the evaporator (33) (details are described later).

When the conditions for step ST4 are satisfied in the cooling operation, the compressor (30) is stopped, i.e., the compressor enters a thermo-off state (step ST5). Then in step ST6, when the blown air temperature SS is "SP+0.4° C." or higher, the flow proceeds to step ST3 to perform the cooling operation. When the conditions for step ST7 are satisfied, the flow proceeds to the pump down operation (step ST8).

The pump down operation is performed before the heating operation (step ST9). The pump down operation is performed to collect the refrigerant remaining in the refrigerant circuit (20) in the receiver (41) (details are described later).

The heating operation is performed when the blown air temperature SS is too low relative to the target temperature SP. In the heating operation, the refrigerant compressed in the compressor (30) (so-called hot gas) is fed to the evaporator (33), and the inside air is heated in the evaporator (33) (details are described later).

When the conditions for step ST10 are satisfied in the heating operation, the compressor (30) is stopped to enter the thermo-off state (step ST11). Then, in step ST12, when the blown air temperature SS remains "SP−0.4° C." for 3 minutes or more, the flow proceeds to step ST9 to perform the heating operation. When the conditions for step ST13 are satisfied, the flow proceeds to step S3 to perform the cooling operation.

<Cooling Operation in Cooling Mode>

Figure 3:
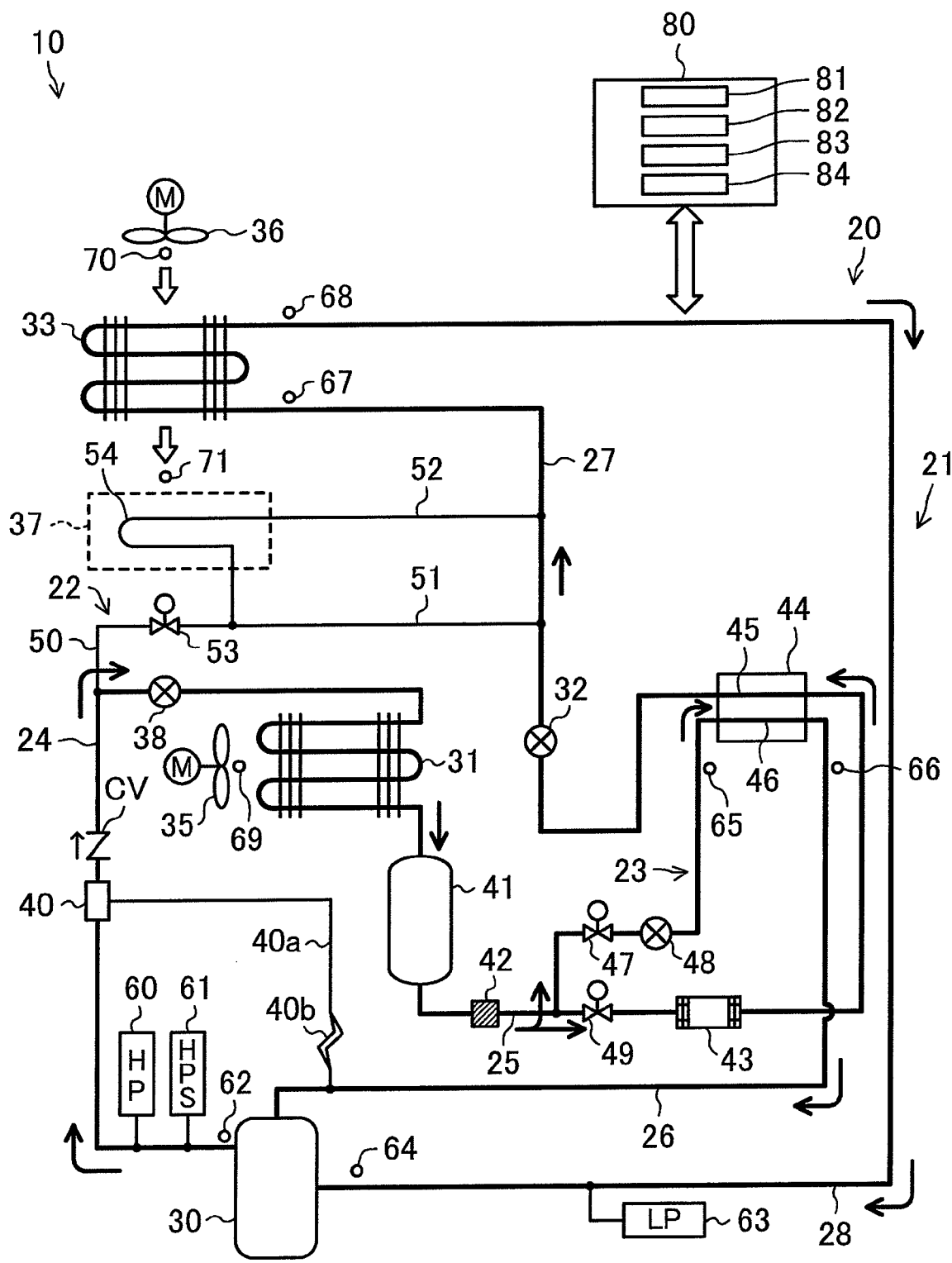
FIG. 3 is a piping diagram showing a flow of a refrigerant in cooling operation in the cooling mode.

In the cooling operation in the cooling mode shown in FIG. 3, the first open/close valve (47) and the second open/close valve (49) are opened, and the third open/close valve (53) is closed. The pressure regulating valve (38) are fully opened, and the degrees of opening of the supercooling expansion valve (48) and the main expansion valve (32) are suitably adjusted. The compressor (30), the outside fan (35), and the inside fan (36) are operated.

The refrigerant compressed in the compressor (30) is condensed (dissipates heat) in the condenser (31), and then passes through the receiver (41). Part of the refrigerant that passed through the receiver (41) flows through the low pressure liquid pipe (27), and the rest of the refrigerant flows into the supercooling branch pipe (26). The refrigerant that passed through the low pressure liquid pipe (27) is decompressed by the main expansion valve (32), and then flows through the evaporator (33). In the evaporator (33), the refrigerant absorbs heat of the inside air to evaporate. Thus, the inside air is cooled. The refrigerant evaporated in the evaporator (33) is sucked into the compressor (30), and is compressed again.

The refrigerant flowed into the supercooling branch pipe (26) is decompressed to an intermediate pressure by passing through the supercooling expansion valve (48), and then flows through the secondary passage (46) of the supercooling heat exchanger (44). In the supercooling heat exchanger (44), the refrigerant flowing through the primary passage (45) and the refrigerant flowing through the secondary passage (46) exchange heat. As a result, the refrigerant flowing through the primary passage (45) is supercooled, while the refrigerant flowing through the secondary passage (46) evaporates. The refrigerant flowing out of the secondary passage (46) is sucked into the intermediate pressure compression chamber through an intermediate port of the compressor (30).

In the cooling operation, the operating speed of rotation (operating frequency) of the compressor (30) is controlled by the compressor control section (81). Specifically, the operating speed of rotation of the compressor (30) is controlled so that the blown air temperature SS approaches the target temperature SP. In the cooling operation, the speed of rotation of the outside fan (35) is controlled by the fan control section (83). Specifically, the speed of rotation of a motor of the outside fan (35) is controlled to keep pressure HP of the high pressure refrigerant detected by the high pressure sensor (60) constant. The fan control section (83) controls the speed of rotation of the inside fan (36) in multiple stages based on a load required to cool the inside of the container.

In the cooling operation, the valve control section (82) controls the degree of opening of the main expansion valve (32) based on the degree of superheat. Specifically, the degree of opening of the main expansion valve (32) is controlled so that the degree of superheat of the low pressure refrigerant sucked into the compressor (30) approaches a predetermined set value. In the cooling operation, the valve control section (82) also controls the degree of opening of the supercooling expansion valve (48) based on the degree of superheat. Specifically, the degree of opening of the supercooling expansion valve (48) is controlled so that the degree of superheat of the intermediate pressure refrigerant flowing out of the secondary passage (46) of the supercooling heat exchanger (44) approaches a predetermined set value.

<Pump Down Operation in Cooling Mode>

Although not shown, the second open/close valve (49) is opened, and the first open/close valve (47) and the third open/close valve (53) are closed in the pump down operation in the cooling mode. The pressure regulating valve (38) is fully opened, and the supercooling expansion valve (48) and the main expansion valve (32) are fully closed. The compressor (30), the outside fan (35), and the inside fan (36) are operated.

When the compressor (30) is operated, the refrigerant in a line from the fully closed main expansion valve (32) to a suction port of the compressor (30) (i.e., the low pressure liquid pipe (27) and the low pressure gas pipe (28)) is sucked into the compressor (30). The refrigerant discharged from the compressor (30) is condensed in the condenser (31) to become liquid, and is contained in the receiver (41). Thus, the refrigerant in the refrigerant circuit (20) is collected in the receiver (41) in the pump down operation.

In the pump down operation, the operating speed of rotation (operating frequency) of the compressor (30) is kept constant in principle. The outside fan (35) is operated at the maximum speed of rotation. This promotes the condensation of the refrigerant in the condenser (31).

<Heating Operation in Cooling Mode>

Figure 4:
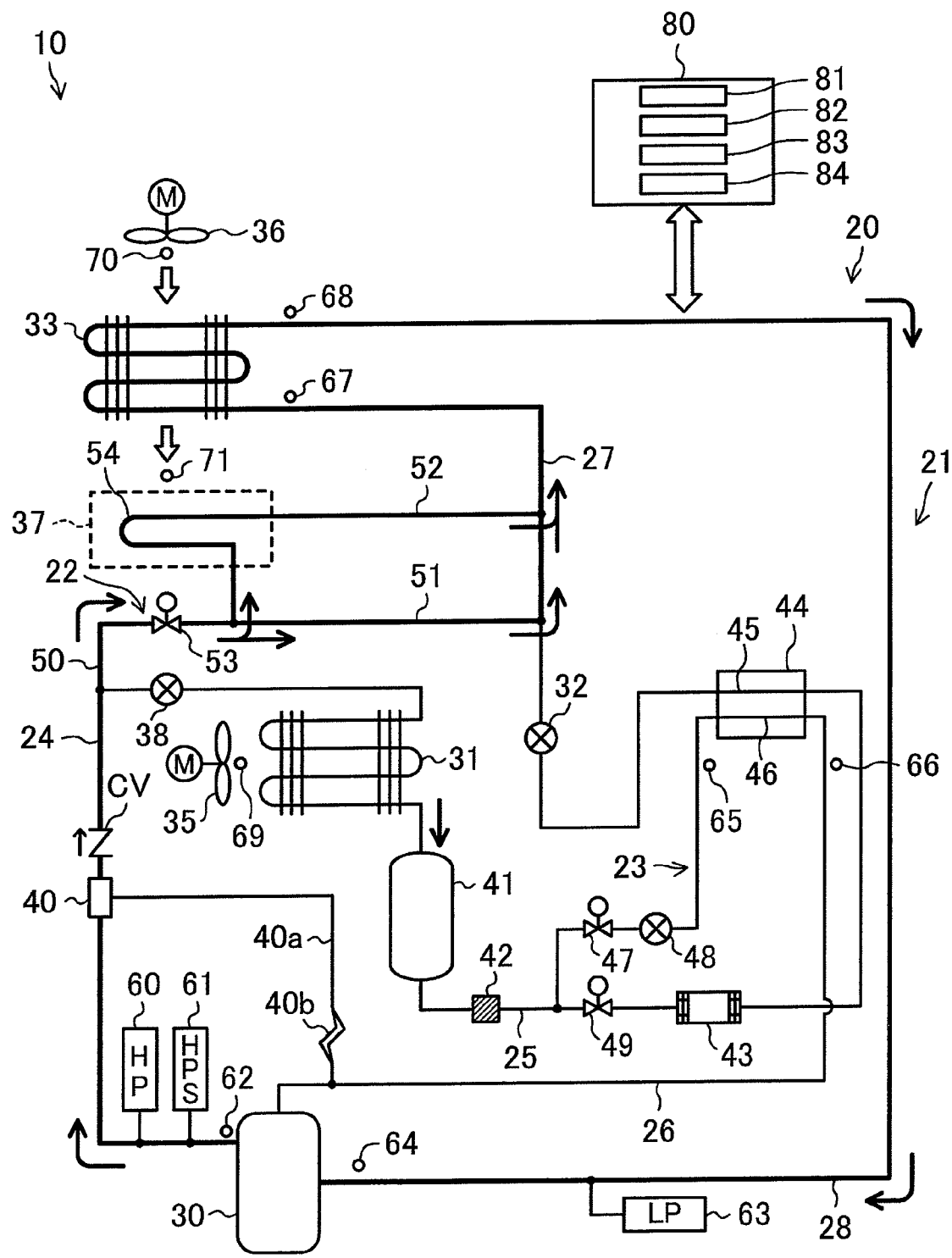
FIG. 4 is a piping diagram showing heating operation in the cooling mode.

In the heating operation in the cooling mode shown in FIG. 4, the high temperature and high pressure gaseous refrigerant compressed in the compressor (30) bypasses the condenser (31), the receiver (41), the supercooling heat exchanger (44), and the main expansion valve (32) to flow into the evaporator (33). As described above, the heating operation is performed when the inside temperature is lower than the target temperature, and the inside of the container is excessively cooled. The pump down operation described above is performed immediately before the heating operation.

In the heating operation, the second open/close valve (49) is closed, and the third open/close valve (53) is opened. The main expansion valve (32) is fully closed (zero pulse). The first open/close valve (47), the pressure regulating valve (38), and the supercooling expansion valve (48) are fully closed in principle (zero pulse). The compressor (30) and the inside fan (36) are operated, while the outside fan (35) is not operated.

The refrigerant compressed in the compressor (30) is fed to the evaporator (33) through the hot gas bypass circuit (22). Specifically, the high temperature and high pressure gaseous refrigerant flows through the main passage (50), and is diverted to the first branch passage (51) and the second branch passage (52). The refrigerant diverted to the second branch passage (52) passes through the drain pan heater (54), and merges with the refrigerant flowing from the first branch passage (51). The merged refrigerant flows into the evaporator (33). The refrigerant dissipates heat to the inside air in the evaporator (33). As a result, the inside air is heated, and the inside temperature can approach the target temperature. The refrigerant dissipated heat in the evaporator (33) is sucked into the compressor (30) and compressed therein.

In the heating operation described above, the following control is performed by the sections (81, 82, 83, 84).

The compressor control section (81) controls the operating speed of rotation (operating frequency) of the compressor (30). Specifically, the compressor control section (81) controls the operating speed of rotation of the compressor (30) so that the blown air temperature SS detected by the outlet temperature sensor (71) approaches the target temperature SP. More specifically, the operating frequency Hz of the compressor (30) can n be calculated from the following equations:

$$Hz = \text{current } Hz \times K$$

$$K = 1 + a \times P + b \times I + c \times D$$

$$P = -K1 \times (SS - SP)$$

$$I = -K1 \times \{0.2 \times (SS + SS5 + SS10 + SS15 + SS20) - SP\}$$

$$D = -K1 \times \{SS - (SS10 + SS15 + SS20)/3\}$$

where a, b, and c are coefficients, SS, SS5, SS10, SS15, and SS20 represent the current blown air temperature, the blown air temperature 5 seconds ago, the blown air temperature 10 seconds ago, the blown air temperature 15 seconds ago, and the blown air temperature 20 seconds ago, respectively, and K1 represents the rate of change of capacity required to change the blown air temperature by 1° C.

The refrigerant amount determining section (84) determines whether the refrigerant circulating in the heating operation is sufficient or not. Based on the amount of the circulating refrigerant, the valve control section (82) controls the first open/close valve (47), the pressure regulating valve (38), and the supercooling expansion valve (48), and the fan control section (83) controls the outside fan (35).

Figure 5:
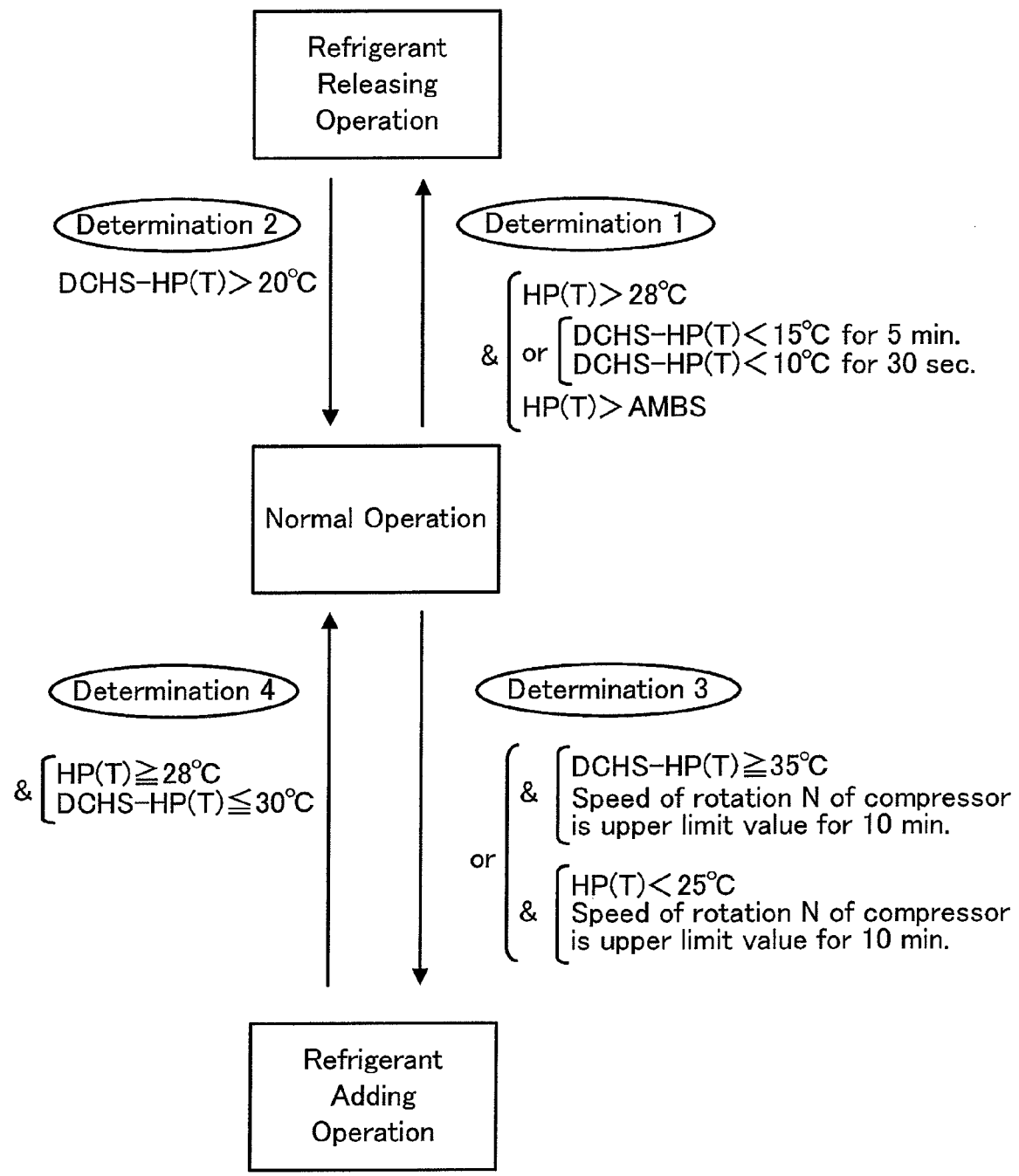
FIG. 5 shows determinations made by a refrigerant amount determining section.
Figure 6:
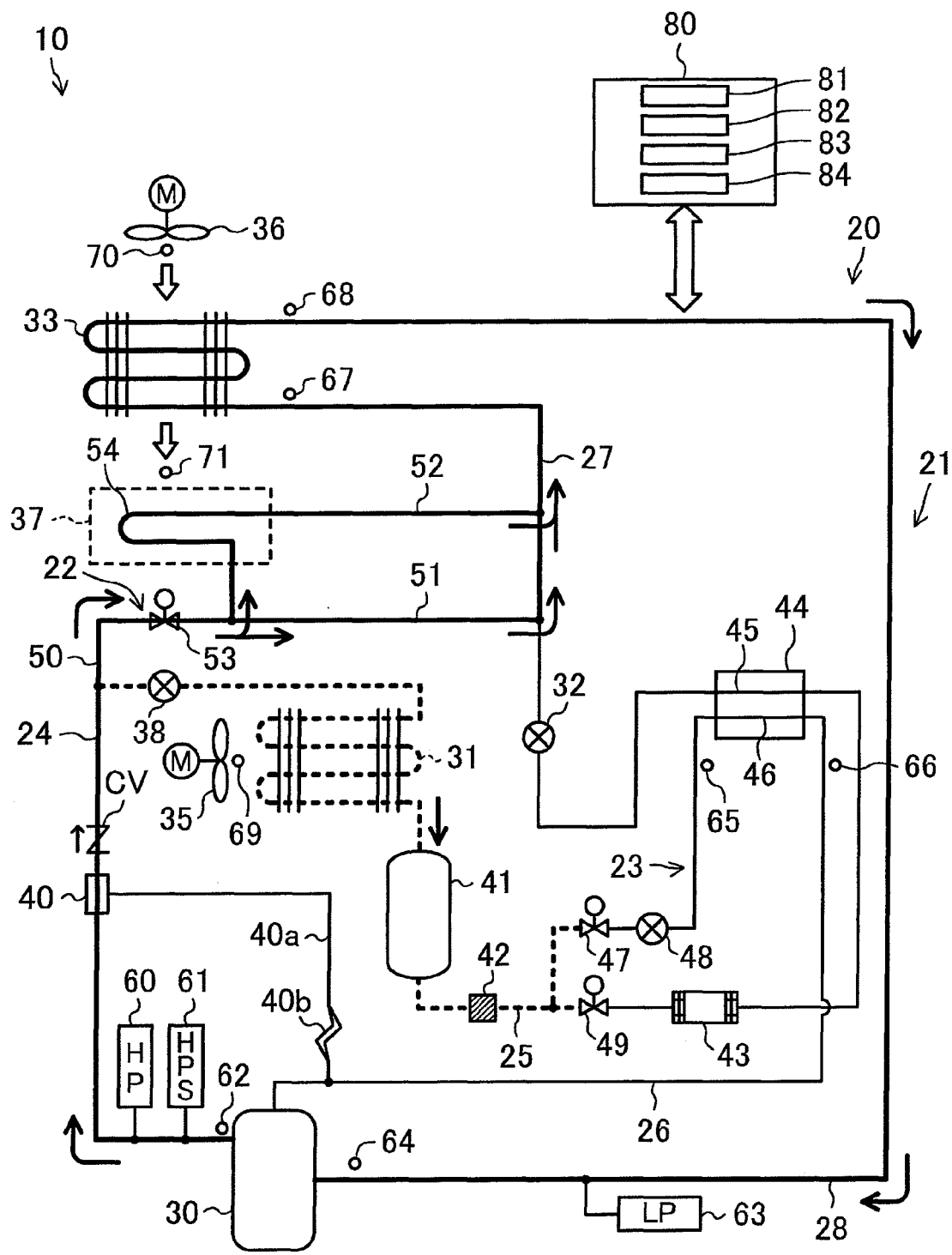
FIG. 6 is a piping diagram showing a flow of a refrigerant in refrigerant releasing operation in the heating operation.

Specifically, the refrigerant amount determining section (84) makes the determination as shown in FIG. 5. When the refrigerant amount determining section (84) determines that the amount of the refrigerant is excessive based on the conditions for Determination 1 shown in FIG. 5 in normal operation (i.e., in the heating shown in FIG. 4), refrigerant releasing operation (refrigerant discharge operation) shown in FIG. 6 is performed. In the refrigerant releasing operation, the valve control section (82) opens the pressure regulating valve (38), and the fan control section (83) operates the outside fan (35) at a lower speed. In the refrigerant releasing operation, part of the high pressure refrigerant dischargd from the compressor (30) is condensed in the condenser (31), and is contained in the receiver (41). Thus, the part of the refrigerant is released to the high pressure liquid pipe (25), thereby reducing the amount of the refrigerant in the heating operation. Part of the liquid refrigerant contained in the receiver (41) flows into the cooling member (42). Thus, the inverter circuit is cooled.

Regarding the conditions for Determination 1 shown in FIG. 5, HP(T) represents a saturation temperature corresponding to the pressure of the refrigerant discharged from the compressor (30) (high pressure refrigerant), DCHS represents the temperature detected by the discharge temperature sensor (62), and AMBS represents the temperature detected by the outside temperature sensor (69). Specifically, when HP(T) representing the saturation temperature corresponding to the pressure of the high pressure refrigerant is higher than a predetermined value, and the degree of superheat SH (DCHS-HP(T)) of the discharged refrigerant is lower than a predetermined value, it is determined that a two-phase refrigerant may be discharged from the compressor (30), and the amount of the circulating refrigerant is reduced to avoid the discharge of the two-phase refrigerant. When the saturation temperature HP(T) is lower than the outside temperature AMBS, the pressure in the condenser (31) exceeds the pressure of the high pressure refrigerant, and the refrigerant flows out of the condenser (31) when the pressure regulating valve (38) is opened. Thus, the saturation temperature HP(T) higher than the outside temperature AMBS is set as one of the conditions for Determination 1. This condition allows reliable releasing of part of the refrigerant discharged from the compressor (30) to the condenser (31) in the refrigerant releasing operation.

In the refrigerant releasing operation, when the refrigerant amount determining section (84) determines that the amount of the refrigerant is appropriate based on the conditions for Determination 2 shown in FIG. 5, the flow proceeds to the normal operation shown in FIG. 4. Specifically, when the degree of superheat SH (DCHS-HP(T)) of the discharged refrigerant is higher than the predetermined value, the flow returns to the normal operation based on the determination that the two-phase refrigerant is provably not be discharged from the compressor (30).

Figure 7:
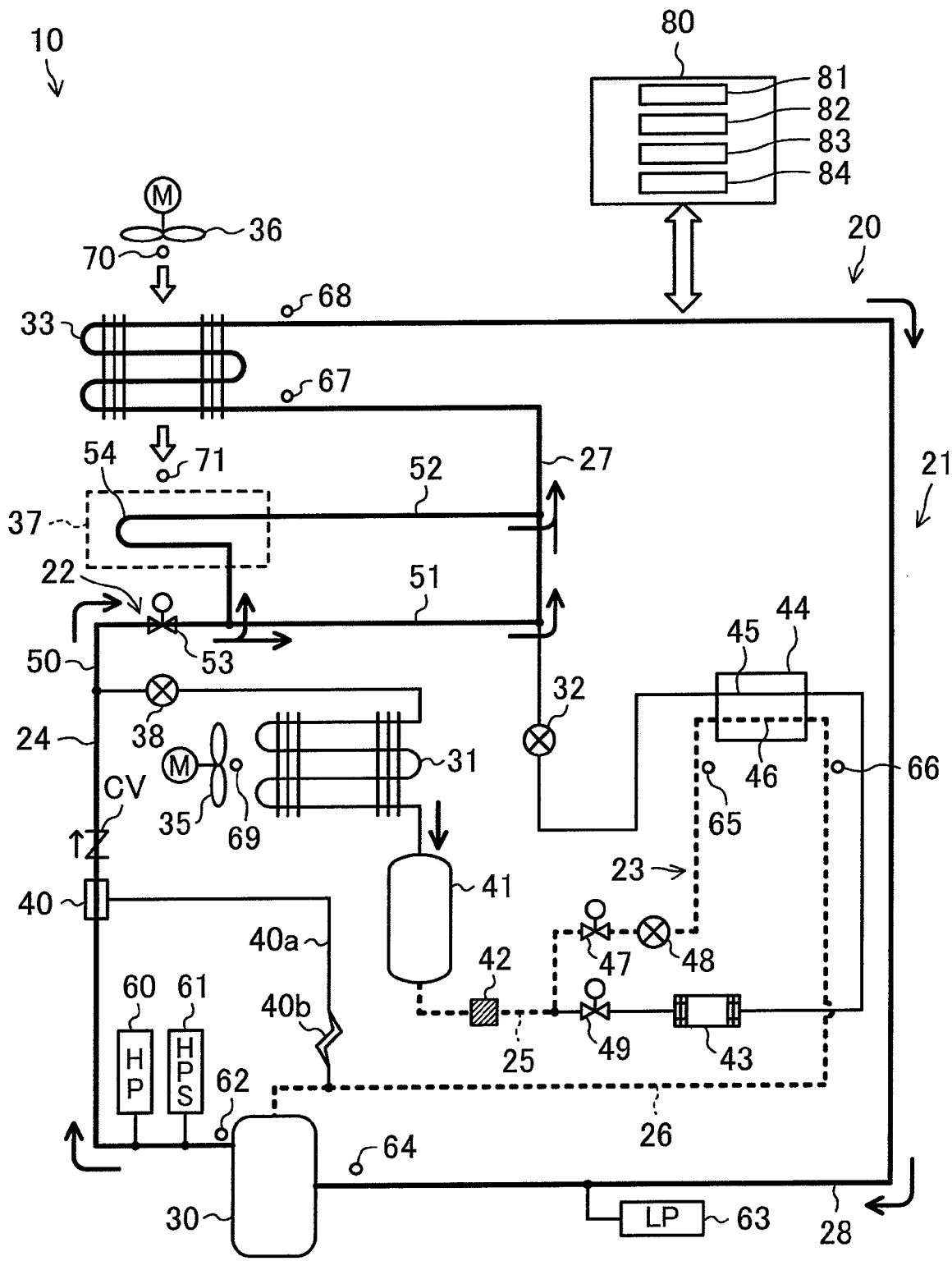
FIG. 7 is a piping diagram showing a flow of a refrigerant in refrigerant adding operation in the heating operation.

In the normal operation, when the refrigerant amount determining section (84) determines that the amount of the refrigerant is insufficient based on the conditions for Determination 3 shown in FIG. 5, refrigerant adding operation (refrigerant feeding operation) shown in FIG. 7 is performed. In the refrigerant adding operation, the valve control section (82) opens the first open/close valve (47) and the supercooling expansion valve (48). The pressure regulating valve (38) is closed, and the outside fan (35) is kept stopped. In the refrigerant adding operation, the liquid refrigerant in the receiver (41) flows into the intermediate pressure compression chamber in the compressor (30) through the supercooling branch pipe (26). Thus, the refrigerant in the high pressure liquid pipe (25) is added (fed) to the refrigerant circulating in the heating operation, thereby increasing the amount of the amount circulating in the heating operation. Also in this case, the liquid refrigerant in the receiver (41) flows through the cooling member (42), thereby cooling the inverter circuit.

In Determination 3 shown in FIG. 5, it is determined that the temperature of the refrigerant discharged from the compressor (30) is abnormally high when the saturation temperature HP(T) is too low, and the degree of superheat SH (DCHS-HP(T)) of the discharged refrigerant remains not lower than the predetermined value for 10 minutes. In this case, the amount of the circulating refrigerant is increased to reduce the degree of superheat SH of the discharged refrigerant, thereby protecting the compressor (30). In Determination 3, a condition that the operating speed of rotation N of the compressor (30) reached an upper limit value is set. When the operating speed of rotation N of the compressor (30) is lower than the upper limit value, the operating speed of rotation is increased to increase the amount of the circulating refrigerant, thereby reducing the degree of superheat SH of the discharged refrigerant. Thus, the degree of superheat SH can more quickly be changed and stabilized by increasing the operating speed of rotation of the compressor (30) than by the refrigerant adding operation described above. Thus, when the operating speed of rotation N of the compressor (30) already reached the upper limit value, and cannot be increased any more, the refrigerant adding operation is performed to reduce the degree of superheat SH of the discharged refrigerant.

In the refrigerant adding operation, when the refrigerant amount determining section (84) determines that the amount of the refrigerant is appropriate based on the conditions for Determination 4 shown in FIG. 5, the flow returns to the normal operation shown in FIG. 4. Specifically, when the saturation temperature HP(T) is not lower than the predetermined value, and the degree of superheat SH (DCHS-HP(T)) of the discharged refrigerant is not higher than the predetermined value, it is determined that the temperature of the refrigerant discharged from the compressor (30) is appropriate, and the flow returns to the normal operation.

In the heating operation in the cooling mode described above, the amount of the refrigerant circulating between the compressor (30) and the evaporator (33) is increased or decreased so that the degree of superheat SH discharged from the compressor (30) reaches the predetermined value (a target range). Specifically, when the degree of superheat SH is low, part of the refrigerant circulating between the compressor (30) and the evaporator (33) is released to the high pressure liquid pipe (25). When the degree of superheat SH is high, the refrigerant in the high pressure liquid pipe (25) is added to the refrigerant circulating between the compressor (30) and the evaporator (33).

Figure 8:
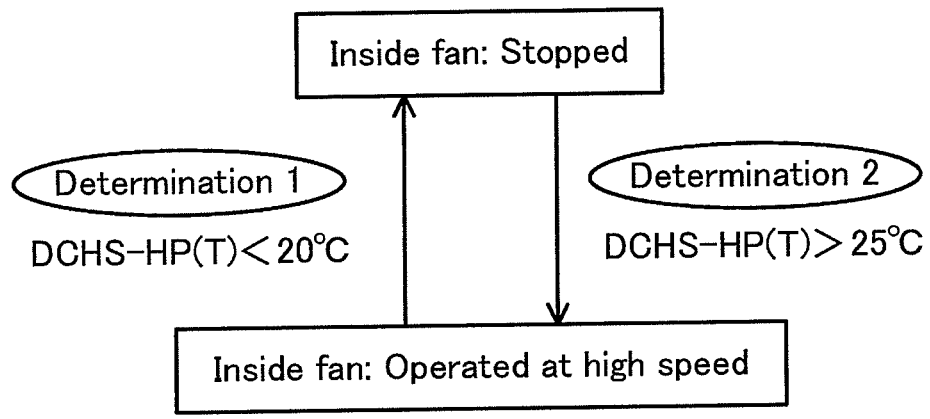
FIG. 8 shows how a fan control section controls a fan.
Figure 9:
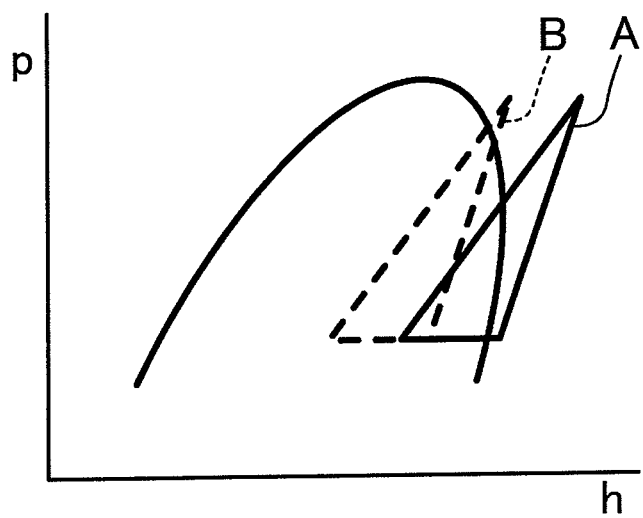
FIG. 9 is a Mollier chart showing the control by the fan control section.

In the heating operation, as shown in FIG. 8, the fan control section (83) controls the inside fan (36). Specifically, the inside fan (36) is controlled so that the degree of superheat SH of the discharged refrigerant reaches the predetermined value (the target range). More specifically, when the degree of superheat SH (DCHS-HP(T)) of the discharged refrigerant is lower than the predetermined value (Determination 1), the inside fan (36) is stopped based on the determination that the two-phase refrigerant is contained in the compressor (30) (plot B in FIG. 9). In this case, the refrigerant in the evaporator (33) is not easily condensed, and the gaseous refrigerant is introduced into the compressor (30) (plot A in FIG. 9). When the degree of superheat SH (DCHS-HP(T)) of the discharged refrigerant is higher than the predetermined value (Determination 2), the inside fan (36) is operated at high speed based on the determination that the gaseous refrigerant is appropriately fed to the compressor (30) (plot A in FIG. 9). Thus, the inside air is actively fed to the evaporator (33), thereby promoting the heating of the inside air. As a result, the blown air temperature SS can quickly approach the target temperature SP. Controlling the inside fan (36) as described above can reliably prevent feeding of the two-phase refrigerant to the compressor (30) in the heating operation (i.e., liquid compression in the compressor (30)).

—Advantages of Embodiment—

According to the embodiment described above, in the heating operation in the cooling mode, the operating speed of rotation of the compressor (30) is controlled so that the blown air temperature SS reaches the target temperature SP. Thus, the amount of the circulating refrigerant can quickly be adjusted based on the blown air temperature SS, thereby adjusting the heating capability as appropriate.

In the above-described embodiment, the amount of the refrigerant circulating between the compressor (30) and the evaporator (33) is adjusted so that the degree of superheat SH of the discharged refrigerant reaches the predetermined value (in the target range). Specifically, when the degree of superheat SH is low, part of the refrigerant circulating between the compressor (30) and the evaporator (33) is released to the high pressure liquid pipe (25) (refrigerant releasing operation), thereby reducing the amount of the circulating refrigerant, and increasing the degree of superheat SH. This can prevent the feeding of the two-phase refrigerant to the compressor (30) (i.e., liquid compression in the compressor (30)). When the degree of superheat SH is high, the refrigerant in the high pressure liquid pipe (25) is added to the refrigerant circulating between the compressor (30) and the evaporator (33) (the refrigerant adding operation), thereby increasing the amount of the circulating refrigerant, and reducing the degree of superheat SH. This can prevent abnormal increase in temperature of the refrigerant discharged from the compressor (30), thereby protecting the compressor (30).

In the above-described embodiment, an additional condition that the saturation temperature HP(T) is higher than the outside temperature AMBS is set as the conditions for performing the refrigerant releasing operation. This can prevent the refrigerant in the high pressure liquid pipe (25) including the condenser (31) from oppositely flowing to the hot gas bypass circuit (22). Thus, the refrigerant releasing operation can reliably be performed, and the liquid compression in the compressor (30) can reliably be prevented.

In the refrigerant releasing operation, the outside fan (35) is operated. Thus, part of the compressed refrigerant released to the condenser (31) can actively be condensed to be the liquid refrigerant. Thus, a large amount of the refrigerant can be stored in the condenser (31) or the receiver (41), thereby performing the refrigerant releasing operation smoothly and reliably.

In the heating operation of the above-described embodiment, the inside fan (36) is controlled so that the degree of superheat SH of the discharged refrigerant reaches the predetermined value (the target range). This can surely prevent the liquid compression in the compressor (30). Thus, the reliability of the container refrigeration apparatus (1'0) improves.

In the refrigerant releasing operation and the refrigerant adding operation, the refrigerant in the receiver (41) flows through the cooling member (42). This can contribute to the cooling of the inverter circuit.

—Alternative of Embodiment—

In an alternative of the embodiment, the pressure regulating valve (38) is kept opened at the predetermined degree of opening (e.g., the minimum degree of opening) in the heating operation of the above-described embodiment. In this case, part of the discharged refrigerant is contained in the receiver (41), and the refrigerant in the receiver (41) flows through the cooling member (42). This can reliably cool the inverter circuit. Thus, the reliability of the container refrigeration apparatus (10) further improves.

INDUSTRIAL APPLICABILITY

As described above, the present invention is useful for a container refrigeration apparatus which cools the inside of the container.

DESCRIPTION OF REFERENCE CHARACTERS

10 Container refrigeration apparatus
20 Refrigerant circuit
21 Main circuit
22 Hot gas bypass circuit
30 Compressor
31 Condenser
32 Main expansion valve (expansion valve)
33 Evaporator
81 Compressor control section
82 Valve control section (refrigerant amount control section)
83 Fan control section

The invention claimed is:

1. A container refrigeration apparatus comprising:
a refrigerant circuit which performs a refrigeration cycle, and includes
   a main circuit sequentially connecting a compressor, a condenser, an expansion valve and an evaporator, and
   a hot gas bypass circuit through which a compressed refrigerant from the compressor bypasses the condenser and the expansion valve to flow into the evaporator;
a compressor control section which controls operating speed of rotation of the compressor during heating operation for heating inside of a container by the evaporator with the compressed refrigerant circulating from the compressor to the compressor through the hot gas bypass circuit and the evaporator so that a temperature inside the container reaches a target temperature;
a refrigerant amount control section which performs, in the heating operation, refrigerant discharge operation for allowing part of the compressed refrigerant from the compressor to flow and remain in a high pressure liquid pipe including the condenser of the main circuit, and refrigerant feeding operation for feeding the refrigerant in the high pressure liquid pipe to the compressor along a path bypassing the evaporator, based on a degree of superheat SH of the compressed refrigerant from the compressor; and
a fan control section which, in the heating operation, stops an evaporator fan of the evaporator when the degree of superheat SH of the compressed refrigerant from the compressor is lower than a predetermined value, and operates the evaporator fan of the evaporator when the degree of superheat SH of the compressed refrigerant from the compressor is higher than the predetermined value.

2. The container refrigeration apparatus of claim 1, further comprising:
a supercooling heat exchanger provided on the high pressure liquid pipe; and
a supercooling branch pipe through which the refrigerant diverted from the high pressure liquid pipe flows to supercool the refrigerant in a liquid state flowing through the high pressure liquid pipe in the supercooling heat exchanger, and then flows into the low pressure gas pipe of the main circuit or an intermediate pressure compression chamber in the compressor, wherein
the refrigerant amount control section feeds the refrigerant in the high pressure liquid pipe to the compressor through the supercooling branch pipe in the refrigerant feeding operation.

3. The container refrigeration apparatus of claim 1 or 2, wherein:
the fan control section which operates a condenser fan of the condenser in the refrigerant discharge operation performed by the refrigerant amount control section.

* * * * *